July 17, 1934.  F. A. CONTERMAN  1,966,920
CENTRIFUGAL EXTRACTOR
Filed Jan. 5, 1931   2 Sheets-Sheet 1
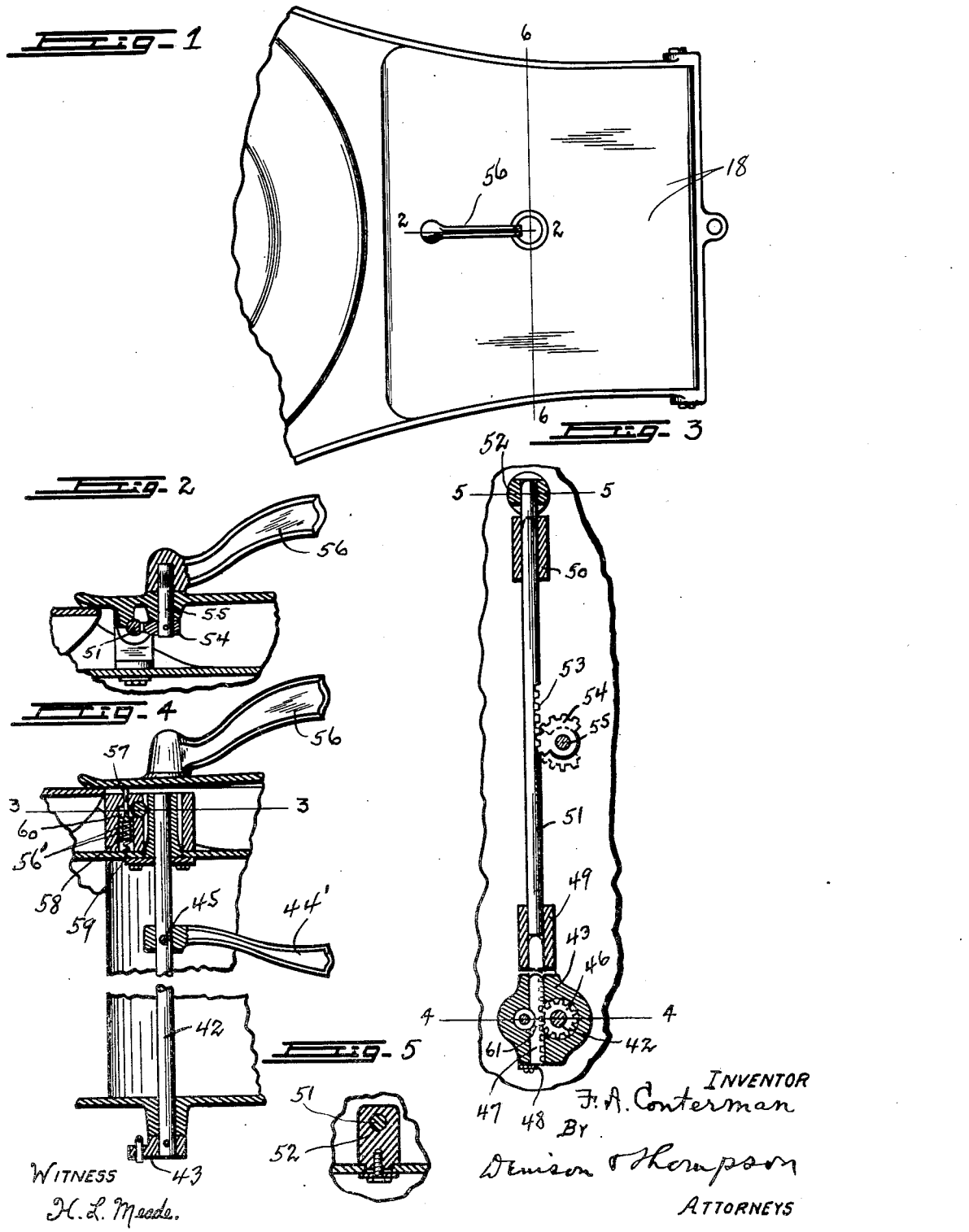

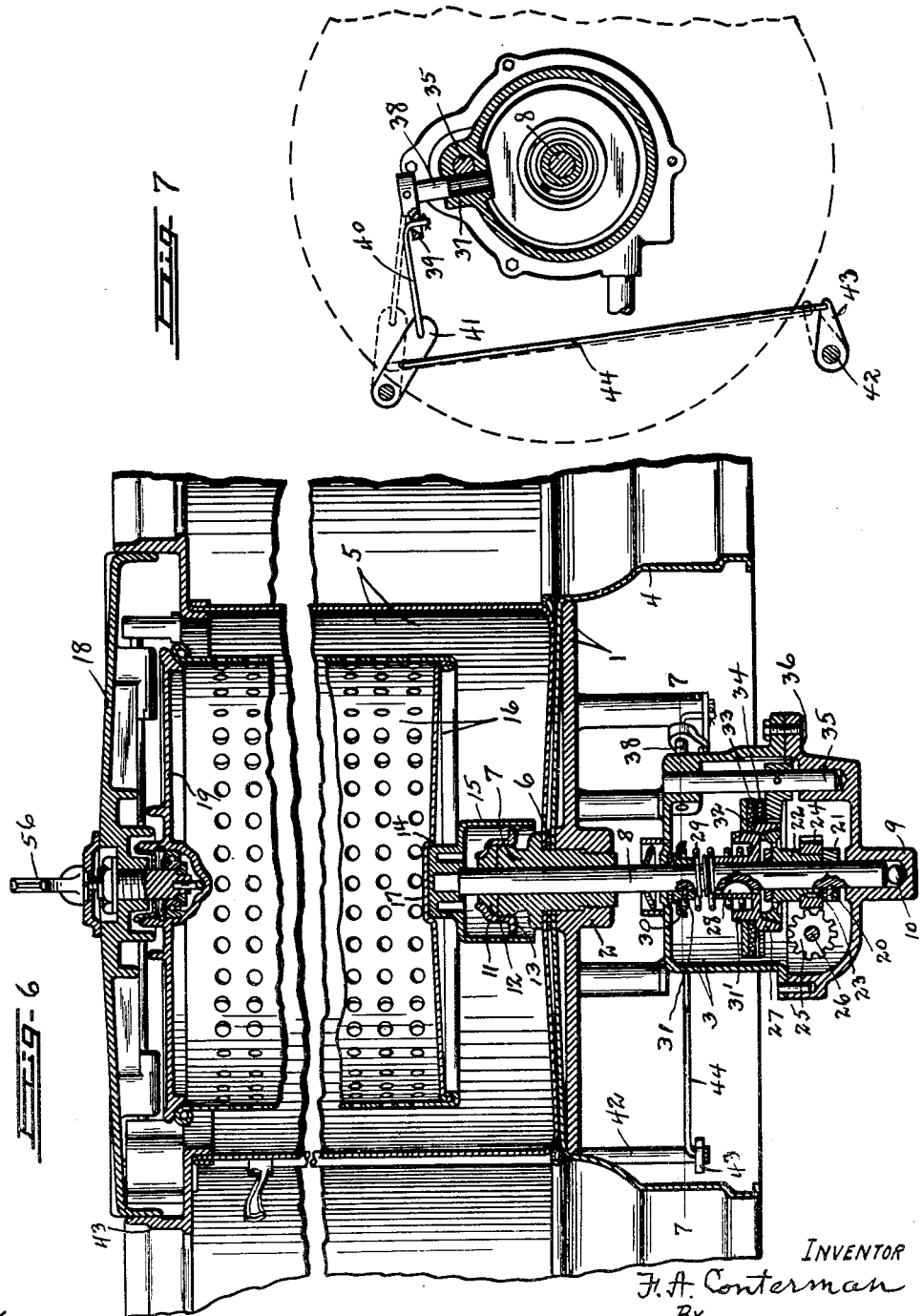

Patented July 17, 1934

1,966,920

UNITED STATES PATENT OFFICE 1,966,920

CENTRIFUGAL EXTRACTOR

Fred A. Conterman, Syracuse, N. Y., assignor to Easy Washing Machine Corporation, Syracuse, N. Y., a corporation of Delaware Application January 5, 1931, Serial No. 506,606

8 Claims. (Cl. 192—136)

This invention relates to a new and improved centrifugal extractor and is particularly well adapted for use in extracting liquid from clothes which are being washed.

The main object of my invention is to provide a device of this character in which, when the extractor basket is started rotating, the cover for the device will be automatically locked in the closed position.

Another object is to provide an apparatus which is so constructed that the extractor basket cannot be made to rotate unless and until the cover is in the closed position.

Another object is to provide an apparatus in which, when the cover is unlocked, the rotation of the extractor basket will be automatically stopped.

Other objects and advantages relate to the details of the construction and to the form, relation and arrangement of parts by which the above objects are accomplished, all as will more fully appear from the following description taken in connection with the accompanying drawings in which:—

Figure 1 is a top plan view, partially broken away, of an apparatus embodying my device.

Figure 2 is a section on line 2—2 of Figure 1.
Figure 3 is a section on line 3—3 of Figure 4.
Figure 4 is a section on line 4—4 of Figure 3.
Figure 5 is a section on line 5—5 of Figure 3.
Figure 6 is a section on line 6—6 of Figure 1.
Figure 7 is a section on line 7—7 of Figure 6.

My device comprises a main frame 1 supported on appropriate legs not shown.

Frame 1 has a centrally disposed internally threaded depending boss 2. To the under side of main frame 1 is secured a gear housing 3. A skirted cover member 4 is positioned on the top of frame 1.

A main vat 5 is positioned on top of member 4 with a gasket 6 interposed therebetween. A tubular supporting member 7 extends downwardly through vat 5 and member 4 and is threaded in boss 2 on frame 1 to lock such parts together.

A vertical shaft 8 has its lower end journaled in a depending boss 9 in the lower end of gear housing 3, a thrust ball 10 being interposed between the lower end of shaft 8 and the bottom of boss 9.

The upper end of shaft 8 is journaled in supporting member 7 and extends upwardly therethrough.

For the purpose of sealing the upper bearing of shaft 8 against liquid extracted from the clothes, I provide a packing gland 11 on the upper end of member 7 secured in position by a collar 12 threaded on the upper end of member 7.

On the lower end of collar 12 is provided an annular flange 13. On the upper end of shaft 8 is positioned a supporting member 14, the upper end of shaft 8 being square and entering a square hole in supporting member 14 so that they may rotate together.

Member 14 has a depending annular skirt 15 which extends beneath flange 13 on member 12 and in spaced relation thereto. The upper end of member 14 is preferably hexagonal in shape.

The foraminous extractor basket 16 has in its bottom an hexagonal recess 17 in which the upper end of member 14 is received so that the rotation of member 14 will cause the rotation of basket 16.

On the upper end of vat 5, I provide a hinged cover 18 having journaled on the under side thereof a rotatable member 19 adapted to frictionally engage the upper end of basket 16 to function as a cover therefor, and also as a guide when basket 16 is rotating.

On the lower end of shaft 8 and secured thereto as by a set screw 20 is a retaining collar 21. Above collar 21 and supported thereon is a male clutch member 22 rotatable on shaft 8.

On the lower end of member 22 and secured thereto as by a pin 23 is a worm gear 24 in mesh with a worm 25 which is secured to a shaft 26 which shaft 26 is in turn secured to the armature shaft of a motor not shown.

A female clutch member 27 is slidably mounted on shaft 8 above clutch member 22 and is held against relative rotary motion with respect to shaft 8 by a key 28.

Encircling shaft 8 is a spiral spring 29 having its lower end abutting against clutch member 27 and having its upper end abutting against a collar 30 which is secured to shaft 8 as by a set screw 31.

The tension of spring 29 is such that it normally urges clutch member 27 downwardly into clutching engagement with clutch member 22. On the upper end of clutch member 27 is secured as by a split ring 31', a circular disk 32 having on its under face a brake lining 33.

Beneath brake lining 33 and encircling clutch member 27 is an annular disk 34.

In one side of gear casing 3 is slidably mounted a vertical shaft 35 carrying a yoke 36 which encircles clutch member 27 and is adapted to contact with member 34 so that the upward movement of shaft 35 carrying with it yoke 36 will cause member 34 to contact with brake lining 33 and carry upwardly clutch member 27 out of clutching engagement with clutch member 22, the frictional contact between member 34 and brake lining 33 aiding to bring shaft 8 to rest.

The upper end of shaft 35 is provided with a plurality of rack teeth in mesh with gear teeth 37 provided on one end of a horizontal rock shaft 38 journaled in gear casing 3.

On the outer end of the shaft 38 is provided a crank arm 39 connected as by a link 40 to one end of a crank 41, the other end of crank 41 being pivotally mounted on main frame 1.

A vertical shaft 42 has its lower end journaled in main frame 1 and extends downwardly therethrough.

On the lower end of shaft 42 is provided a crank arm 43 connected as by a link 44 to crank 41. The upper end of rock shaft 42 is journaled in a flange 43 secured to the upper end of vat 5.

Beneath flange 43, an operating lever 44' is secured as by a pin 45 to rock shaft 42. The rocking of shaft 42 will, through crank arm 43, link 44, crank 41, link 40 and crank arm 39, cause the rocking of shaft 38 and this, in turn, will cause vertical shaft 35 to be raised or lowered as desired to de-clutch members 27 and 22 or move them to the clutching position.

On the upper end of shaft 42 is secured a gear 46 in mesh with rack teeth on a slidable pin 47. Pin 47 is slidably mounted in flange 43 and may be moved inwardly beyond the inner edge of flange 43, but may be moved outwardly only to the outer edge thereof, a stop 48 being provided to limit the outward movement of pin 47.

On the under surface of cover 18 are provided opposed spaced tubular lugs 49 and 50. A shaft 51 is slidably mounted in lugs 49 and 50 and is of such a length that when properly positioned, it will extend from the outer end of lug 49 to the outer end of lug 50.

The aperture in lug 49 is in alinement with the aperture in the flange 43 in which the rod or pin 47 is positioned so that when rock shaft 42 is rocked to move clutch members 27 and 22 into clutching relationship to cause the rotation of basket 16, rod 47 will be moved inwardly into the aperture in lug 49 to lock the cover 18 in the closed position.

When this movement of rod 47 takes place, it will contact with rod 51 to move the same axially and to move the opposite end out beyond the outer end of lug 50.

Adjacent the outer end of lug 50 and on flange 43 is provided a tubular boss 52 in registration with the aperture in lug 50 so that when rod 51 moves outwardly beyond the outer end of lug 50, it will enter the aperture in boss 52 and become an additional means for locking cover 18 in the closed position.

At approximately the center point of rod 51, I provide a plurality of rack teeth 53 in mesh with a segmental gear 54 which is secured to the lower end of a vertical rock shaft 55 which is journaled in cover 18.

To the upper end of rock shaft 55 is secured an operating lever 56 by means of which segmental gear 54 may cause the axial movement of the rod 51.

When rock shaft 42 is in the position to hold clutch members 27 and 22 out of clutching engagement, the rod or pin 47 will be fully retracted in flange 43 abutting against the stop member 48.

When the rod 47 is in this position and the lever 56 has been manipulated to withdraw rod 51 from boss 52 the cover 18 may be opened.

It is desirable, if not absolutely essential, that means be provided to make it impossible for rock shaft 42 to be manipulated when the cover 18 is open and to accomplish this result, I provide in flange 43 adjacent rod 47 a vertically extending spring-pressed pin 56' having an upper end 57 comparatively small in diameter and a lower tubular end 58.

A spiral spring 59 is positioned in the lower end 58, abutting against flange 43 and normally tends to move member 56' upwardly to the top of the aperture 60 in which it is positioned.

At approximately the middle point of pin 47, I provide a notch 61. The relation of parts is such that when the pin 47 is in the fully retracted position, the notch 61 will be in registration with member 56' and member 56' will move upwardly to bring its enlarged lower end 58 into registration with the notch 61 in pin 47 so that such pin 47 can not be moved axially.

When the parts are in this position, the upper end 57 of member 56' which is of such a diameter as to be out of the path of movement of pin 47, will extend upwardly above the flange 43.

When the cover 18 is returned to the closed position, it will contact with the upper end 57 of the member 56' and will move such member 56' downwardly against the action of the spring 59 to carry the enlarged lower end 58 of member 56' out of registration with pin 47 so that the same may be moved axially.

When the cover is in the locked position with the pin 47 positioned in the aperture in the lug 49 in which position of parts the basket 16 is rotating, and it is desired to open the cover 18, the lever 56 may be manipulated to cause gear 54 to move axially to withdraw the end of rod 51 from the aperture in lug 52. This movement of rod 51 will cause rod 47 to be pushed out from the aperture in lug 49 to fully unlock the cover 18. This movement of rod 47 will, through gear 46, cause shaft 42 to be rocked to move members 27 and 22 out of clutching engagement so that the basket 16 will come to rest.

This relation of parts permits the unlocking of cover 18 and the stopping of basket 16 to be accomplished by the manipulation of only the lever 56 without the necessity of also manually manipulating the lever 44'.

Similarly, when the cover is closed and the lever 44' is manipulated to start rotation of basket 16, rod 47 will automatically enter the aperture in lug 49 carrying before it rod 51 and moving the same into registration with the aperture in lug 52 so that the starting of basket 16 by manipulation of lever 44 will, at the same time, lock cover 18 in position without any necessity of manipulating lever 56.

I claim:

1. In a device of the class described, a vat, an extractor basket rotatably mounted in the vat, a cover for the vat, a transverse rod slidably mounted on the cover for movement into and out of engagement with the vat, a source of power, a connection between the source of power and the extractor basket including a clutch, a rock shaft operatively connected to the clutch, a locking member on the vat and connected to the rock shaft for simultaneous movement, said locking member being adapted to be moved into engagement with the cover and into engagement with the transverse rod to move the latter axially and into engagement with the vat when the rock shaft is moved to a position to render the clutch operative.

2. In a device of the class described, a vat, an extractor basket rotatably mounted in the vat, a cover for the vat, a transverse rod slidably mounted on the cover for movement into and out of engagement with the vat, a source of power, a connection between the source of power and the extractor basket including a clutch, a vertical rock shaft operatively connected to the clutch, a locking member on the vat and connected to the rock shaft for simultaneous movement, said locking member being adapted to be moved into engagement with the cover and into engagement with the transverse rod to move the latter axially and into engagement with the vat when the rock shaft is moved to a position to render the clutch operative.

3. In a device of the class described, a vat, an extractor basket rotatably mounted in the vat, a cover for the vat, a transverse rod slidably mounted on the cover for movement into and out of engagement with the vat, a source of power, a connection between the source of power and the extractor basket including a clutch, a rock shaft operatively connected to the clutch, a locking member on the vat and connected to the rock shaft for simultaneous movement, said locking member being adapted to be moved into engagement with the cover and into engagement with the transverse rod to move the latter axially and into engagement with the vat when the rock shaft is moved to a position to render the clutch operative, and means for moving the transverse shaft axially out of engagement with the vat and into engagement with the locking member to move the same out of engagement with the cover and to rock the shaft to a position to render the clutch inoperative.

4. In a device of the class described, a vat, an extractor basket rotatably mounted in the vat, a cover for the vat, a transverse rod slidably mounted on the cover for movement into and out of engagement with the vat, a source of power, a connection between the source of power and the extractor basket including a clutch, a vertical rock shaft operatively connected to the clutch, a locking member on the vat and connected to the rock shaft for simultaneous movement, said locking member being adapted to be moved into engagement with the cover and into engagement with the transverse rod to move the latter axially and into engagement with the vat when the rock shaft is moved to a position to render the clutch operative, and means for moving the transverse shaft axially out of engagement with the vat and into engagement with the locking member to move the same out of engagement with the cover and to rock the shaft to a position to render the clutch inoperative.

5. In a device of the class described, a vat, an extractor basket rotatably mounted in the vat, a cover for the vat, a transverse rod slidably mounted on the cover for movement into and out of engagement with the vat, a source of power, a connection between the source of power and the extractor basket including a clutch, a rock shaft operatively connected to the clutch, a locking member on the vat and connected to the rock shaft for simultaneous movement, said locking member being adapted to be moved into engagement with the cover and into engagement with the transverse rod to move the latter axially and into engagement with the vat when the rock shaft is moved to a position to render the clutch operative, means for moving the transverse shaft axially out of engagement with the vat and into engagement with the locking member to move the same out of engagement with the cover and to rock the shaft to a position to render the clutch inoperative, and means for holding the rock shaft against movement when the cover is open.

6. In a device of the class described, a vat, an extractor basket rotatably mounted in the vat, a cover for the vat, a transverse rod slidably mounted on the cover for movement into and out of engagement with the vat, a source of power, a connection between the source of power and the extractor basket including a clutch, a vertical rock shaft operatively connected to the clutch, a locking member on the vat and connected to the rock shaft for simultaneous movement, said locking member being adapted to be moved into engagement with the cover and into engagement with the transverse rod to move the latter axially and into engagement with the vat when the rock shaft is moved to a position to render the clutch operative, means for moving the transverse shaft axially out of engagement with the vat and into engagement with the locking member to move the same out of engagement with the cover and to rock the shaft to a position to render the clutch inoperative, and means for holding the rock shaft against movement when the cover is open.

7. In a device of the class described, a rotary clothes container, a cover movable to and from a position across the top of the container, a controlling member movable from a neutral position to cause the operation of the container, a cover locking member carried on the cover and movable relatively to the cover and actuated by the controlling member for locking the cover in its closed position, said controlling member being returnable to its neutral position independently of the locking member.

8. In a device of the class described, a rotary clothes container, a cover movable to and from a position across the top of the container, a controlling member movable from a neutral position to another position to cause the operation of the container, and a cover locking member carried on the cover and movable relatively to the cover and actuated by the controlling member to lock the cover in its position, said locking member being movable to its cover locking position independently of the controlling member.

FRED A. CONTERMAN.